United States Patent [19]

Oda et al.

[11] Patent Number: 4,589,302
[45] Date of Patent: May 20, 1986

[54] CONTROL SYSTEM FOR AN AUTOMOTIVE DRIVING SYSTEM INCLUDING AN ENGINE THROTTLE VALVE AND A STEPLESS TRANSMISSION

[75] Inventors: Hiroyuki Oda, Hiroshima; Katsuhiko Yokooku, Saka; Nobuhide Seo; Hideo Shiraishi, both of Hiroshima, all of Japan

[73] Assignee: Mazda Motor Corporation, Japan

[21] Appl. No.: 602,964

[22] Filed: Apr. 23, 1984

[30] Foreign Application Priority Data

Apr. 26, 1983 [JP] Japan ................... 58-73225

[51] Int. Cl.⁴ ................. B60K 41/12; B60K 41/18
[52] U.S. Cl. ........................... 74/866; 74/877
[58] Field of Search ............. 74/866, 870, 871, 877

[56] References Cited

U.S. PATENT DOCUMENTS

| | | | |
|---|---|---|---|
| 4,281,567 | 8/1981 | Maurer | 74/860 X |
| 4,438,664 | 3/1984 | Fiala | 74/877 X |
| 4,459,878 | 7/1984 | Frank | 74/865 X |
| 4,498,429 | 2/1985 | Satow et al. | 123/564 X |
| 4,505,169 | 3/1985 | Ganoung | 74/866 X |
| 4,507,986 | 4/1985 | Okamura et al. | 74/866 |
| 4,509,125 | 4/1985 | Fattic et al. | 474/11 X |
| 4,515,040 | 5/1985 | Tateuchi et al. | 74/866 |
| 4,515,041 | 5/1985 | Frank et al. | 74/866 |

FOREIGN PATENT DOCUMENTS 53-134162 11/1978 Japan.
56-46153 4/1981 Japan.

*Primary Examiner*—George H. Krizmanich
*Assistant Examiner*—Dirk Wright
*Attorney, Agent, or Firm*—Gerald J. Ferguson, Jr.

[57] ABSTRACT

An automotive driving control system comprises a stepless transmission provided between the engine and the driving wheels, a transmission control for controlling the transmission ratio of the stepless transmission, a throttle valve driver for driving the throttle valve of the engine, an accelerator position sensor for detecting the amount of depression of the accelerator pedal, and a control for controlling the transmission control and the throttle valve driver. The control controls the transmission control and the throttle valve driver to respectively control the opening degree of the throttle valve and the transmission ratio of the stepless transmission so that engine output corresponding to the amount of depression of the accelerator pedal is obtained. There is further provided an acceleration requirement detector for detecting an acceleration requirement by way of change in the amount of depression of the accelerator pedal, the rate of change of the same (i.e., depressing speed of the accelerator pedal), or the amount or the rate of change in state of the vehicle due to the operation of the accelerator pedal such as negative pressure in the intake passage. Said control is arranged to control said transmission control and/or said throttle valve driver so that engine output is made maximum when the acceleration requirement is larger than a predetermined value.

11 Claims, 11 Drawing Figures

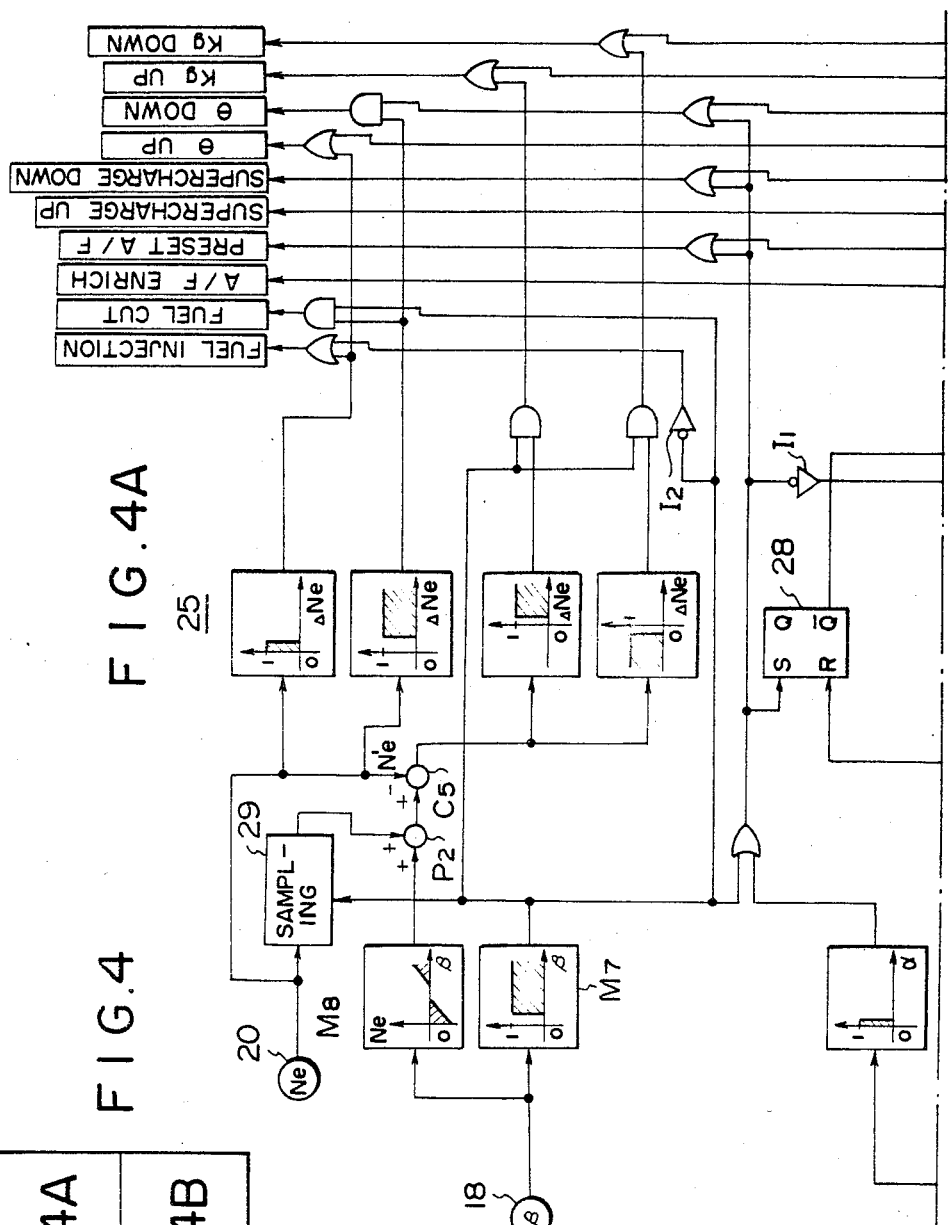

CONTROL SYSTEM FOR AN AUTOMOTIVE DRIVING SYSTEM INCLUDING AN ENGINE THROTTLE VALVE AND A STEPLESS TRANSMISSION

BACKGROUND OF THE INVENTION

1. Field of the Invention

This invention relates to an automotive driving control system, and more particularly to an automotive driving control system for controlling the driving state of an automobile determined by engine speed, torque and the like to a desired state in response to depression of the accelerator pedal.

2. Description of the Prior Art

In FIG. 1a, curves E1, E2 and E3 are contour lines joining points of equal specific fuel consumption in an ordinary automobile depicted on an orthogonal coordinate system which is used to express the operating state of an automobile, the abscissa and the ordinate respectively representing the engine speed (Ne) and the engine torque (Te). In other words, in the ordinary automobile in which a transmission having set transmission ratios is used and the engine output and/or the vehicle speed are controlled by changing the opening degree of the throttle valve, it is necessary to set the engine so that the region D of minimum specific fuel consumption corresponds to an opening degree of the throttle valve slightly smaller than the full or maximum opening degree in order to obtain a large torque during, for instance, acceleration by full opening the throttle valve and at the same time actuating, for instance, an air-fuel ratio enriching device, thereby ensuring reserve torque. When controlling the driving state of an automobile provided with such an engine, it is preferred that the operating state of the automobile be caused to fall within the region D of minimum specific fuel consumption bounded by the curve E1 or near thereto. Curve A in FIG. 1a is a contour line, for the full-opening degree of the throttle valve.

In Japanese Unexamined Patent Publication No. 53(1978)-134162, there is disclosed a fuel consumption saving type automotive driving control system embodying a concept for improving the specific fuel consumption. In the control device, the opening degrees and the transmission ratios optimal for the purpose described above are calculated for various operating states of the automobile and mapped, and an optimal throttle valve opening degree and an optimal transmission ratio are read out from the map according to the particular amount of depression of the accelerator pedal to control the throttle valve opening degree and the transmission ratio of the transmission.

Further, it is known that any engine output which has conventionally been obtained with a fixed transmission ratio can be obtained with the throttle valve fixed at the full open position by changing the transmission ratio. In FIG. 1b, line A is an engine speed-torque characteristic curve showing the relationship between torque and speed in case that the throttle valve is fixed at the full open position (This curve will be referred to as "full open line", hereinbelow.), line B is the same in case that the transmission ratio is fixed (This curve will be referred to as "fixed gear line", hereinbelow.), and line C is the same in case that the engine output is fixed (This curve will be referred to as "fixed output line", hereinbelow.). In almost all the conventional automobiles, since a transmission having preset transmission ratios, e.g., first speed to fifth speed, is used and the engine speed-torque characteristics in the case of fixed transmission ratio are as shown by the fixed gear line B, it has been necessary to control the engine output by controlling the throttle valve opening degree. When it is assumed that the engine output is 80PS in a certain operating state on the fixed gear line B, e.g., operating state b corresponding to an engine speed of 3000 rpm and a torque T1, and when the engine speed is gradually lowered without changing the engine output, torque is increased along the fixed output line C as shown by the arrow c and takes value T2 at the intersection a of the fixed output line C and the full open line A, the value of the engine speed at the intersection a being 2000 rpm. This means that any engine output which has conventionally been obtained with a fixed transmission ratio can be obtained with the throttle valve fixed at the full open position by changing the transmission ratio. That is, by using a stepless transmission so that the transmission ratio can be continuously changed, the automobile can be controlled to a desired operating state with the throttle valve held full open. Further, since the engine output and the vehicle speed can be ensured, with this control system, by changing the transmission ratio, an engine having the region D of the minimum specific fuel consumption near the full open line A as shown in FIG. 1c can be used. Further in this control system, the pressure in the intake passage downstream of the throttle valve cannot become negative and accordingly pumping loss of the engine output can be substantially reduced.

In such a fuel consumption saving type automobile, it is preferred that the maximum acceleration performance be exhibited when the acceleration pedal is abruptly depressed by a large amount.

SUMMARY OF THE INVENTION

The primary object of the present invention is to provide a fuel consumption saving type automotive driving control system in which the engine output can be made maximum to obtain a maximum acceleration when the vehicle is to be abruptly accelerated.

The automotive driving control system of the present invention comprises a stepless transmission provided between the engine and the driving wheels, a transmission control means for controlling the transmission ratio of the stepless transmission, a throttle valve driving means for driving the throttle valve of the engine, an accelerator position sensor for detecting the amount of depression of the accelerator pedal, and control means for controlling the transmission control means and the throttle valve driving means. The control means controls the transmission control means and the throttle valve driving means to respectively control the opening degree of the throttle valve and the transmission ratio of the stepless transmission so that engine output corresponding to the amount of depression of the accelerator pedal is obtained. There is further provided an acceleration requirement detecting means for detecting an acceleration requirement by way of change in the amount of depression of the accelerator pedal, the rate of change of the same (i.e., depressing speed of the accelerator pedal), or the amount or the rate of change in state of the vehicle due to the operation of the accelerator pedal such as negative pressure in the intake passage. Said control means is arranged to control said transmission control means and/or said throttle valve driving means so that engine output is made maximum when the acceleration requirement is larger than a predetermined value.

Thus in the automotive driving control system of the present invention, the engine output is made maximum and fixed point acceleration is effected at the engine output upon abrupt acceleration of the vehicle, thereby enabling optimal acceleration performance to be exhibited.

BRIEF DESCRIPTION OF THE DRAWINGS

FIGS. 4A and 4B, is a view for illustrating the operation of the control means employed in the system.

DESCRIPTION OF THE PREFERRED EMBODIMENTS

Figure 1A:
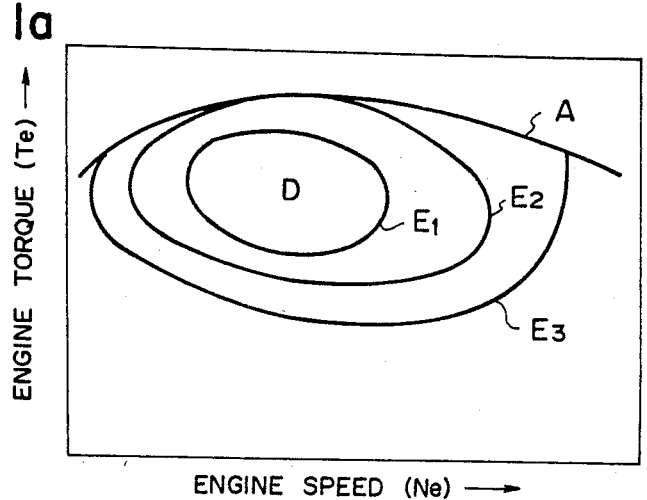
FIG. 1a shows constant specific fuel consumption regions in the case of conventional automobiles in which the abscissa and the ordinate respectively represent the engine speed Ne and the engine torque Te.
Figure 1B:
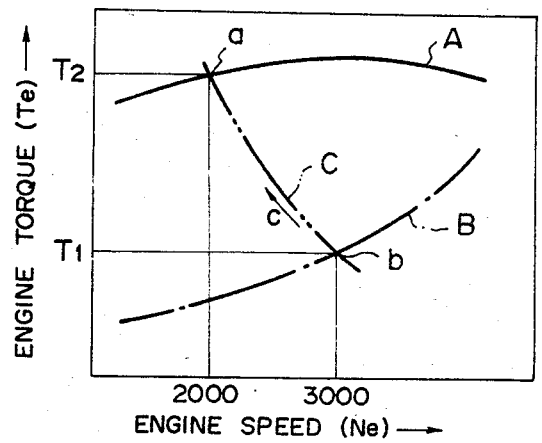
FIG. 1b shows engine speed-torque characteristic curves for illustrating the principle of a preferred embodiment of the present invention.
Figure 1C:
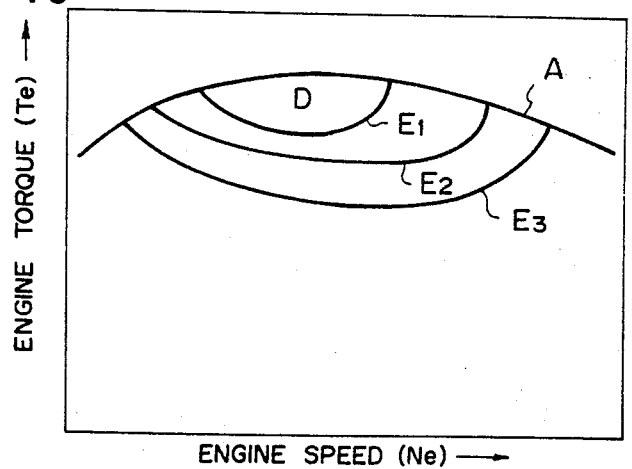
FIG. 1c, is a view similar to FIG. 1a but in the case of an automobile provided with the driving control system in accordance with the preferred embodiment.
Figure 2:
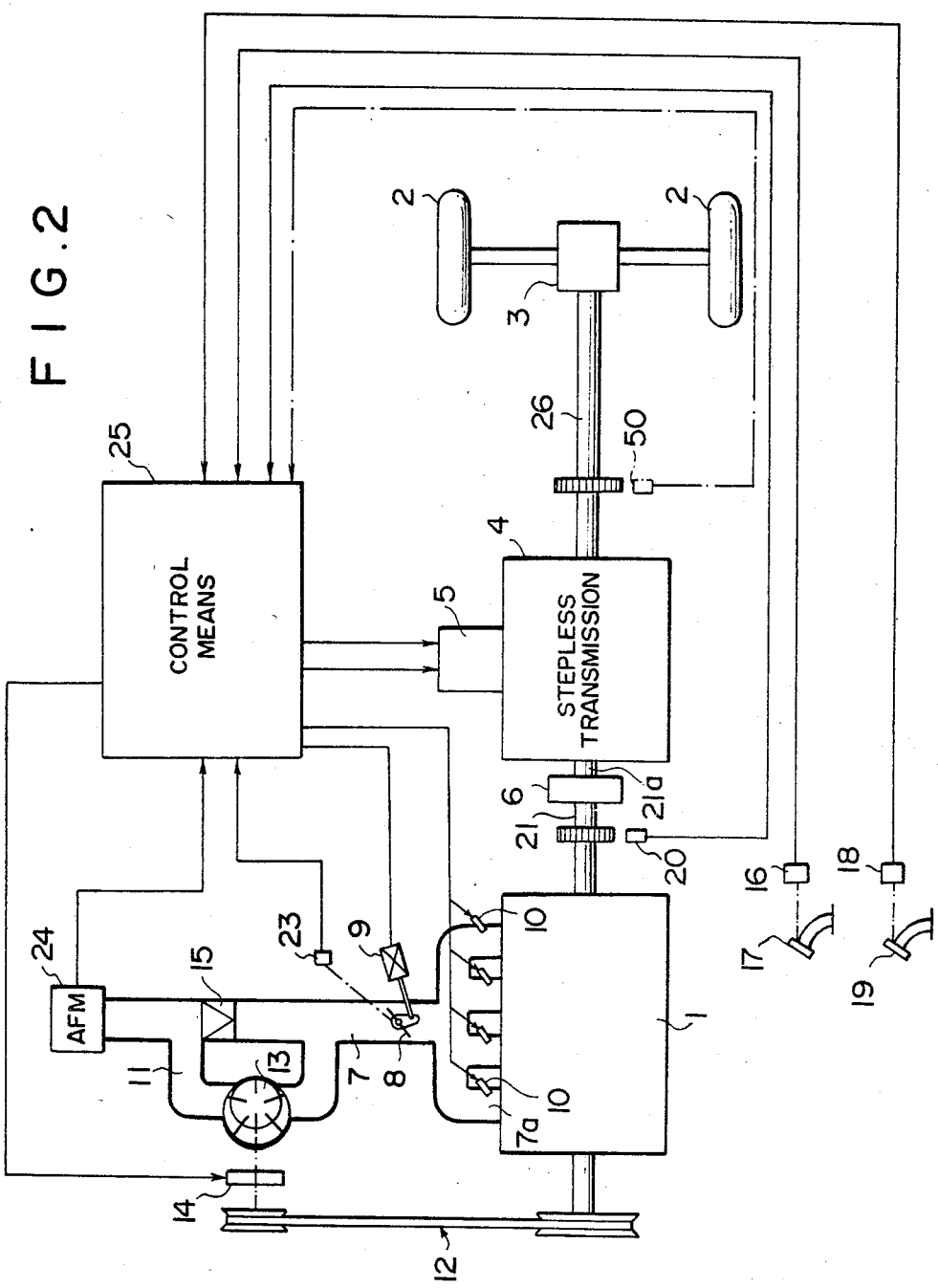
FIG. 2 is a schematic diagram of a driving control system in accordance with an embodiment of the present invention.

FIG. 2 shows an automotive driving control system in accordance with an embodiment of the present invention. In FIG. 2, an engine 1 is provided with a throttle valve 8 in its intake passage 7. A check valve 15 is disposed in the intake passage 7 upstream of the throttle valve 8 and a bypass passage 11 is provided to bypass the check valve 15. A supercharger 13 for increasing torque of the engine 1 is disposed in the bypass passage 11. The driving force (engine output) of the engine 1 is delivered to the supercharger 13 by way of a belt transmission mechanism 12, and an electromagnetic clutch 14 is inserted between the supercharger 13 and the belt transmission mechanism 12 to control the driving force delivered to the supercharger 13. The lower part of the intake passage 7 downstream of the throttle valve 8 is divided into four intake passages 7a, one for each cylinder. Fuel injection valves 10 are disposed in the intake passages 7a one to each passage.

To the output shaft 21 of the engine 1 is connected a stepless transmission 4 by way of a clutch 6. The clutch 6 controls delivery of the driving force of the engine 1 to the input shaft 21a of the stepless transmission 4. The driving shaft 26 of the transmission 4 is connected to driving wheels 2 by way of a differential gear 3. The transmission ratio Kg of the stepless transmission 4 is controlled by a transmission control device 5. The transmission control device 5 is arranged to change the transmission ratio at a rate lower than the rate of change of the engine speed (rpm) Ne so that there is no transmission shock during acceleration or deceleration of the engine 1.

Figure 3:
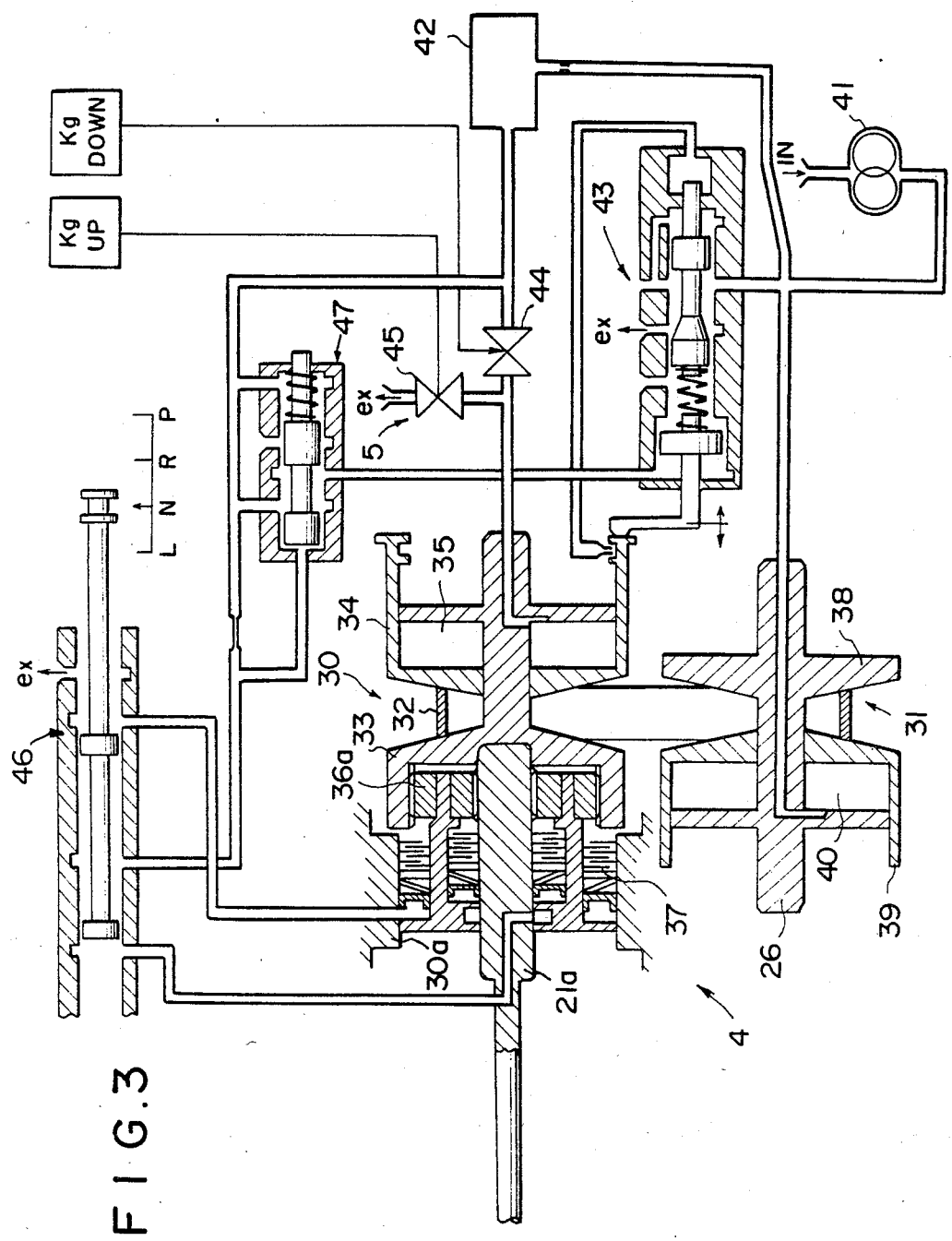
FIG. 3 is a schematic view showing the stepless transmission employed in the system of FIG. 2, FIG. 4, which is split into

The stepless transmission 4 and the transmission control device 5 are shown in detail in FIG. 3. A primary pulley 30 is mounted on the input shaft 21a which is driven by the output shaft 21 of the engine 1. On the driving shaft 26 is mounted a secondary pulley 31. The pulleys 30 and 31 are connected with each other by way of a V-belt 32. The primary pulley 30 comprises a stationary pulley half 33 and a movable pulley half 34 which is opposed to the stationary pulley half 33 and is movable toward and away from the stationary pulley half 33. A hydraulic pressure chamber 35 is defined behind the movable pulley half 34. A planet gear 36 engages the input shaft 21a with the stationary pulley half 33. A hydraulic clutch 37 acts on the planet gear 36 in response to manual operation of a shift lever (not shown). When the shift lever is shifted to "forward" L, the hydraulic clutch 37 causes the planet gear 36 to be fixedly engaged with the input shaft 21a under the control of a manually operated valve 46 which is operated in response to the operation of the shift lever, whereby the stationary pulley half 33 of the primary pulley 30 is rotated in the same direction as the input shaft 21a. When the shift lever is shifted to "reverse" R, the planet gear 36 is fixedly engaged with a casing 30a so that the stationary pulley half 33 is rotated in the opposite direction to that of the input shaft 21a. Similarly to the primary pulley 30, the secondary pulley 31 comprises a stationary pulley half 38 and a movable pulley half 39 which is opposed to the stationary pulley half 38 and is movable toward and away from the stationary pulley half 38. A hydraulic pressure chamber 40 is defined behind the movable pulley half 39. The hydraulic pressure chambers 35 and 40 are connected to an oil pump 41 by way of a regulator valve 42. A secondary valve 43 controls delivery and removal of hydraulic pressure to and from the hydraulic pressure chamber 40 of the secondary pulley 31 in response to movement of the movable pulley half 34 of the primary pulley 30. The space between the movable pulley half and the stationary pulley half of each pulley changes according to the hydraulic pressure applied to the corresponding hydraulic pressure chamber, and the V-belt 32 radially moves back and forth in response to the change in the space between the movable and stationary pulley halves. This changes the effective diameter of the primary and secondary pulleys 30 and 31, thereby permitting continuous change in the transmission ratio. A first solenoid valve 44 is provided between the regulator valve 42 and the hydraulic pressure chamber 35 of the primary pulley 30 in order to control delivery of hydraulic pressure to the hydraulic pressure chamber 35. The first solenoid valve 44 opens upon receipt of a transmission-ratio-down signal (to be described later) to deliver hydraulic pressure to the hydraulic pressure chamber 35 of the primary pulley 30, thereby moving the movable pulley half 34 toward the stationary pulley half 33 to reduce the space therebetween. When the movable pulley half 34 is moved toward the stationary pulley half 33, the pressure in the hydraulic pressure chamber 40 of the secondary pulley 31 is relieved under the control of the secondary valve 43 and the movable pulley half 39 moves away from the stationary pulley half 38 to enlarge the space therebetween, whereby the transmission ratio Kg of the stepless transmission 4 is reduced. Between the hydraulic pressure chamber 35 of the primary pulley 30 and the first solenoid valve 44 is provided a second solenoid valve 45 for controlling removal of hydraulic pressure from the hydraulic pressure chamber 35 of the primary pulley 30. The second solenoid valve 45 opens upon receipt of a transmission-ratio-up signal (to be described later) to relieve hydraulic pressure from the hydraulic pressure chamber 35, thereby moving the movable pulley half 34 away from the stationary pulley half 33 to enlarge the space therebetween. When the movable pulley half 34 is moved away from the stationary pulley half 33, hydraulic pressure is delivered to the hydraulic pressure chamber 40 of the secondary pulley 31 under the control of the secondary valve 43 and the movable pulley half 39 is moved toward the stationary pulley half 38 to reduce the space therebetween, whereby the transmission ratio Kg of the stepless transmission is increased. Reference numeral 47 denotes a clutch valve for breaking the driving connection between the primary and secondary pulleys 30 and 31 provided by the V-belt 32.

In FIG. 2, reference numeral 16 denotes an accelerator position sensor for detecting the amount of depression α of the accelerator pedal 17. The accelerator position sensor 16 also serves as an acceleration requirement detecting means which detects the acceleration requirement from the change in the amount of depression α of the accelerator pedal 17. Reference numerals 18, 20, 22 and 24 respectively denote a brake position sensor for detecting the amount of depression β of a brake pedal 19, an engine speed sensor for detecting engine speed (rpm) Ne, an engine torque sensor for detecting engine torque Te through the torque of the output shaft 21 of the engine 1 and an airflow meter for detecting the amount of the air intake. Reference numerals 23 and 9 respectively denote a throttle position sensor for detecting the opening degree θ of the throttle valve 8 and a throttle valve actuator for opening and closing the throttle valve 8. The opening degree θ of the throttle valve 8 is substantially equivalent to engine load or engine torque Te. The outputs of the sensors 16, 18, 20, 22 and 23 and the airflow meter 24 are inputted into a control means 25 which may be either an analogue computer or a microcomputer which controls the transmission control device 5, the throttle valve actuator 9, the fuel injection valves 10, and the electromagnetic clutch 14.

Now the operation of the control means 25 will be described with reference to the logic diagram shown in FIG. 4. In the logic diagram, the amount of depression α of the accelerator pedal 17 is regarded as a parameter of engine output requirement Pd.

Figure 4B:
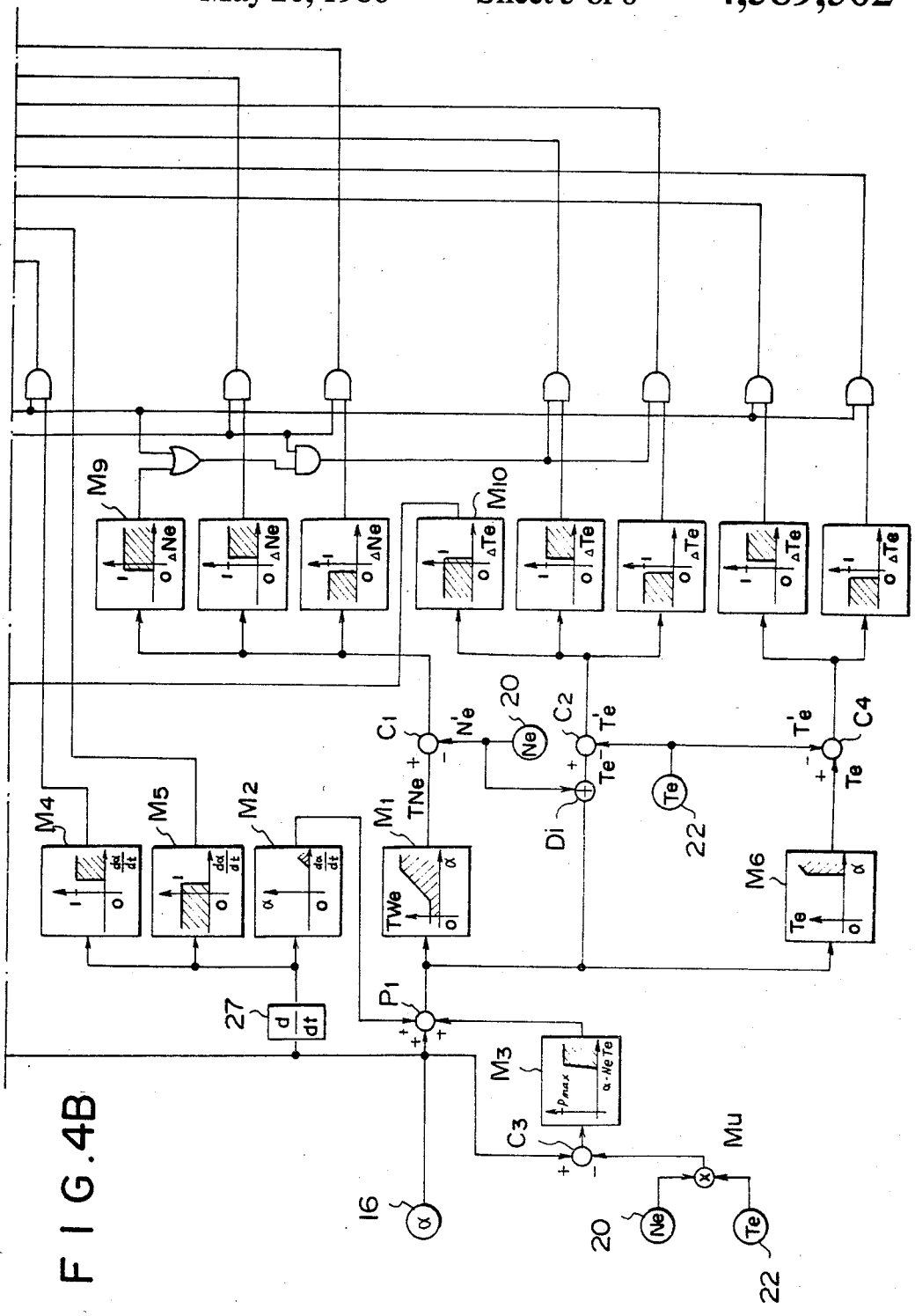

As shown in FIG. 4, the control means 25 is provided with a first map Ml in which a target engine speed TNe is mapped with respect to the amount of depression α of the accelerator pedal 17. During steady running operation of the vehicle, a target engine speed TNe is read out from the first map Ml corresponding to the detected amount of depression α of the accelerator pedal 17, and the target engine speed TNe is compared by a comparator C1 with the actual engine speed Ne' represented by the output signal of the engine speed sensor 20. When deviation ΔNe (=TNe−Ne') is larger than zero (ΔNe>0), and at the same time the amount of depression β of the brake pedal 19 as detected by the brake position sensor 18 is smaller than a predetermined value, i.e., the brake pedal 19 is not depressed, a transmission-ratio-up signal is generated and fed to the second solenoid valve 45 of the transmission control device 5 to increase the transmission ratio Kg of the stepless transmission 4, thereby increasing the engine speed. When the deviation ΔNe is smaller than zero (ΔNe<0) and at the same time the brake pedal 19 is not depressed, a transmission-ratio-down signal is generated and fed to the first solenoid valve 44 of the transmission control device 5 to reduce the transmission ratio Kg of the stepless transmission 4, thereby reducing the engine speed Ne. Thus, feedback control is effected for convergence of the actual engine speed with the target engine speed TNe. Further, during steady running operation, the detected amount of depression α of the accelerator pedal 17 (i.e., engine output requirement Pd) is divided in a divider Di, by the actual engine speed Ne represented by the output signal of the engine speed sensor 20 to obtain a target engine torque Te. The target engine torque Te is compared with the actual engine torque Te', represented by the output signal of the engine torque sensor 22, by a comparator C2. When the deviation ΔTe (=Te−Te') is larger than zero and at the same time the brake pedal 19 is not depressed, a throttle-opening-degree-up signal is generated and fed to the throttle valve actuator 9 to increase the opening degree θ of the throttle valve 8, thereby increasing the engine torque. On the other hand, when the deviation ΔTe is smaller than zero, a throttle-opening-degree-down signal is generated and fed to the throttle valve actuator 9 to reduce the opening degree θ of the throttle valve 8, thereby reducing the engine torque. Thus, feedback control is effected for convergence of the engine torque with the target engine torque Te or for convergence of the opening degree θ of the throttle valve 8 with a target opening degree.

Figure 6A:
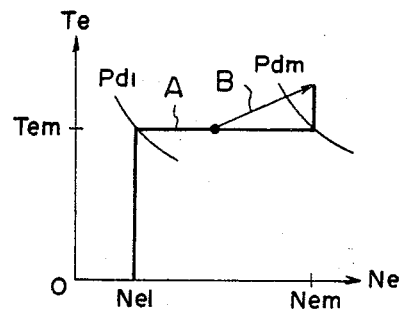
FIGS. 6a and 6b are views for illustrating the first map employed in the control means shown in FIG. 4.
Figure 6B:
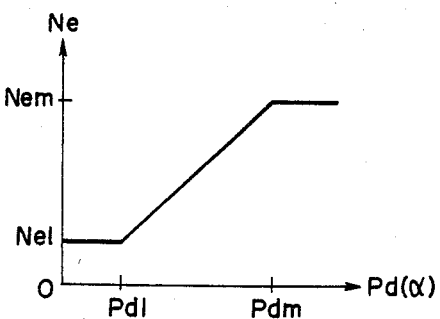

The first map M1 will now be described in detail with reference to FIG. 6. The performance curve (engine speed Ne - engine torque Te curve) of the engine 1 is set as shown in FIG. 6a. During steady running operation, the engine 1 exhibits performance characteristics shown by curve A in FIG. 6a. That is, when the engine output requirement Pd is lower than a first preset value indicated at Pdl in FIG. 6a, i.e., when the amount of depression α of the accelerator pedal 17 is smaller than a first predetermined value, engine torque Te changes with the engine speed Ne fixed at a minimum engine speed Nel within the stability limit. When the engine output requirement Pd is higher than the first preset value Pdl and lower than a second preset value Pdm which is higher than the first preset value Pdl, i.e., when the amount of depression α of the accelerator pedal 17 is between the first predetermined value and a second predetermined value, the engine speed Ne changes along the full open line or a line near thereto so that the engine torque Te is held at a maximum engine torque Tem, that is, the engine speed Ne changes with the opening degree θ of the throttle valve 8 being held at a full open value or preset value θm near thereto. When the engine output requirement Pd is higher than the second preset value Pdm, i.e., when the amount of depression α of the accelerator pedal 17 is larger than the second predetermined value, torque increasing means such as the supercharger 13 or air-fuel ratio enriching means is operated with the engine speed Ne fixed at the maximum engine speed Nem to further increase the engine torque Te. Along the performance characteristic curve A, the engine 1 operates on the lower speed heavier load side whereby an optimal fuel consumption efficiency can be obtained. FIG. 6b shows the engine output requirement Pd (or amount of depression of the accelerator pedal)—engine speed Ne curve depicted based on the engine performance characteristic curve A (Ne-Te curve), the abscissa and ordinate respectively representing the engine output Pd and the engine speed Ne. The curve shown in FIG. 6b corresponds to the first map Ml. That is, during steady running operation of the vehicle, the transmission ratio Kg (which controls the engine speed Ne) and the opening degree $\theta$ of the throttle valve 8 (which controls the engine torque Te) are mutually controlled based on the value of the target engine speed Ne read out from the first map Ml corresponding to the amount of depression $\alpha$ of the accelerator pedal 17, and the value of the target engine torque Te obtained by dividing the engine output requirement Pd by the actual engine speed Ne' in the divider Di so that the engine output requirement Pd represented by the amount of depression $\alpha$ of the accelerator pedal 17 is satisfied on the Ne-Te curve A along which an optimal fuel consumption efficiency can be obtained.

When accelerator pedal 17 is depressed to accelerate the vehicle, the amount of depression $\alpha$ of the accelerator pedal 17 represented by the output signal of the accelerator position sensor 16 is differentiated by a differentiating circuit 27 to obtain the rate of change $d\alpha/dt$ of the amount of depression of accelerator pedal 17. When the value of the rate of change $d\alpha/dt$ is larger than a predetermined value preset in a second map M2, i.e., when the vehicle is to be accelerated by an intermediate amount, a correction value read out from the second map M2 is added to the amount of depression $\alpha$ of the accelerator pedal 17 represented by the output signal of the accelerator position sensor 16 at an adding point P1. Then the corrected amount of depression $\alpha$ of the accelerator pedal 17 is processed in the same manner as in the case of steady running operation to feed the transmission-ratio-up signal or the transmission-ratio-down signal to the transmission control device 5 to effect feedback control, and to feed the throttle-opening-degree-up signal or the throttle-opening-degree-down signal to the throttle valve actuator 9 to effect feedback control, thereby effecting fixed point acceleration after increasing the engine output over the engine output requirement Pd represented by the amount of depression $\alpha$ of the accelerator pedal 17.

Further, in a comparator C3, the actual amount of depression $\alpha$ of the accelerator pedal 17 represented by the output signal of the accelerator position sensor 16 is compared with the actual or detected engine output Pd' calculated by multiplying together the detected engine speed Ne represented by the output signal of the engine speed sensor 20 and detected engine torque Te represented by the output signal of the engine torque sensor 22 in the multiplier Mu (Pd'=Ne.Te), and when the deviation ($\alpha$-Pd') is larger than a predetermined value preset in a third map M3 which is the case when the accelerator pedal 17 is abruptly pushed down by a large amount, a correction value read out from the third map M3 is added to the amount of depression $\alpha$ at the adding point P1 to correct the engine output requirement Pd to a maximum value Pmax. Then, the output signal from the adding point P1 representing the engine output requirement Pd of the maximum value Pmax is processed in the same manner as in the case of the intermediate acceleration of the vehicle to effect feedback control of the transmission ratio Kg and the opening degree $\theta$ of the throttle valve 8 to satisfy the engine output requirement Pd of the maximum value Pmax.

When the rate of change $d\alpha/dt$ of the amount of depression $\alpha$ of the accelerator pedal 17 is larger than a predetermined value preset in a fourth map M4 and when the brake pedal 19 is not depressed, which is the case when the vehicle is to be accelerated slightly, an air-fuel ratio enriching signal is generated and fed to the fuel injection valves 10 to increase the amount of fuel to be injected therefrom, thereby immediately increasing the engine torque Te over a maximum engine torque Tem. Thereafter, feedback control is effected based on the value read out from the first map Ml and the output value of the divider Di to increase the engine speed to the target engine speed Ne with the engine output held at a constant value corresponding to the amount of depression $\alpha$ of the accelerator pedal 17. The slight acceleration of the vehicle is thus effected smoothly with high response. When the rate of change $d\alpha/dt$ of the amount of depression $\alpha$ of the accelerator pedal 17 is smaller than a predetermined value preset in a fifth map M5, a preset-air-fuel-ratio signal is generated and fed to the fuel injection valves 10 to hold the amount of fuel to be injected therefrom at a preset value. It is preferred that the rate at which the air-fuel ratio is made leaner be smaller than the rate of increase of the engine output during acceleration in order to prevent torque shock.

During speed adjusting operation in which the accelerator pedal 17 is permitted to move upward to adjust the vehicle speed to a desired constant speed, the control based only on the output value of the divider Di is first effected to immediately reduce the opening degree $\theta$ of the throttle valve 8 in response to reduction of the amount of depression $\alpha$ of the accelerator pedal 17, thereby reducing the engine output to the target engine output, and then the control based on both the value read out from the first map Ml and the output value of the divider Di is effected to control the transmission ratio Kg (engine speed Ne) and the opening degree $\theta$ of the throttle valve 8 to respective target values, whereby the vehicle speed is controlled to the desired speed with high response without torque shock. That the control based only on the output value of the divider Di is first effected is owing to the difference between the response in controlling the opening degree $\theta$ of the throttle valve 8 and the response in controlling the engine speed Ne.

During high speed heavy load operation of the engine in which the amount of depression $\alpha$ of the accelerator pedal 17 is larger than said second predetermined value, a target engine torque Te read out from a sixth map M6 corresponding to the amount of depression $\alpha$ of the accelerator pedal 17 is compared, in a comparator C4, with the actual or detected engine torque Te' represented by the output signal of the engine torque sensor 22. When the deviation $\Delta Te$ (=Te-Te ) is larger than zero and the brake pedal 19 is not depressed, a super-charging-pressure-up signal is generated and fed to the electromagnetic clutch 14 to actuate the supercharger 13, thereby increasing the engine torque. On the other hand when the deviation $\Delta Te$ is smaller than zero and there is no depression of the brake pedal 19, a super-charging-pressure-down signal is generated and fed to the electromagnetic clutch 14 to interrupt operation of the supercharger 13, thereby reducing the engine torque. Thus, feedback control is effected to control the engine torque to the target engine torque.

When the amount of depression $\beta$ of the brake pedal 19 detected by the brake position sensor 18 is larger than a predetermined value preset in a seventh map M7, which is the case when the vehicle is decelerated, the throttle-opening-degree-down signal, the supercharging-pressure-down signal and the preset-air-fuel-ratio signal are generated and at the same time generation of the various signals to be generated when the accelerator pedal 17 is depressed is prevented by virtue of a flip-flop 28 and an inverter I1 to positively reduce the opening degree $\theta$ of the throttle valve 8, interrupt operation of the supercharger 13 and set the air-fuel ratio at the preset value. At the same time, a fuel-cut signal is generated and fed to the fuel injection valves 10 ("0" signal inverted from "1" signal by an inverter I2 prevents generation of a fuel injection signal) to interrupt fuel-injection from the fuel injection valves 10 if the engine speed is higher than a predetermined value. Thus, good deceleration performance upon depression of the brake pedal 19 is ensured.

When the amount of depression $\beta$ of the brake pedal 19 represented by the brake position sensor 18 is smaller than a first predetermined value preset in an eighth map M8 which is the case when the vehicle is decelerated slightly, a sampling circuit 29 samples the engine speed Ne upon depression of the brake pedal 19 and the sampled engine speed is corrected by a negative correction value read out from the eighth map M8 at an adding point P2 to determine a target engine speed TNe which is lower than the engine speed upon depression of the brake pedal 19. The target engine speed TNe is compared, in a comparator C5, with the actual engine speed Ne' represented by the output signal of the engine speed sensor 20. When the deviation $\Delta$Ne (=Ne1−Ne') is larger than zero and there is depression of the brake pedal 19, the transmission-ratio-up signal is generated and fed to the transmission control device 5 to increase the transmission ratio Kg, thereby increasing the engine speed. On the other hand, when the deviation $\Delta$Ne is smaller than zero and there is depression of the brake pedal 19, the transmission-ratio-down signal is generated and fed to the transmission control device 5 to reduce the transmission ratio Kg, thereby reducing the engine speed. Thus, feedback control is effected to control the engine speed to the target engine speed Ne1 which is lower than the engine speed upon depression of the brake pedal 19. This is advantageous in that engine noise during slight deceleration in which the deceleration requirement is relatively small can be reduced quickly and effectively.

When the amount of depression $\alpha$ of the brake pedal 19 represented by the output signal of the brake position sensor 18 is between said first predetermined value and a second predetermined value which is preset in the eighth map M8 and larger than the first predetermined value, which is the case when an intermediate deceleration is required, the correction value read from the eighth map M8 is zero, and therefore the engine speed upon depression of the brake pedal 19 as outputted from the sampling circuit 29 forms the target engine speed TNe as it is. That is, the target engine speed TNe in this case is equal to the engine speed upon depression of the brake pedal 19. Then the similar feedback control is effected to fix the engine speed Ne at the engine speed upon depression of the brake pedal 19, whereby engine noise can be reduced ensuring engine-brake performance corresponding to the deceleration requirement during the intermediate deceleration.

When the amount of depression $\alpha$ of the brake pedal 19 is larger than the second predetermined value which is the case when abrupt deceleration is required a positive correction value is read out from the eighth map M8 and is added to the engine speed upon depression of the brake pedal 19 as outputted from the sampling circuit 29 to form a target engine speed Ne2 which is higher than the engine speed upon depression of the brake pedal 19, and a similar feedback control is effected to control the engine speed to the target engine speed Ne2 which is higher than the engine speed upon depression of the brake pedal 19. Thus, maximum engine-brake performance is ensured upon abrupt deceleration.

When the actual engine speed Ne' represented by the output signal of the engine speed sensor 20 is lower than said predetermined value, the throttle-opening-degree-up signal and the fuel-injection signal are generated to positively increase the opening degree $\theta$ of the throttle valve 8 and to permit fuel-injection, thereby ensuring drivability during very low speed operation. When the actual engine speed Ne' is higher than the predetermined value, generation of the throttle-opening-degree-down signal and the fuel-cut signal can be permitted.

When the operating state of the vehicle returns to steady running from deceleration, the amount of depression $\beta$ of the brake pedal 19 decreases below the predetermined value upon release of the brake pedal 19 and accordingly "0" signal is outputted from the seventh map M7. The "0" signal is inverted into "1" signal by the inverter I1, and accordingly generation of the transmission-ratio-up signal or the transmission-ratio-down signal is permitted and feedback control is effected to control (reduce) the transmission ratio (and accordingly the engine speed) to the target value corresponding to the amount of depression $\alpha$ of the accelerator pedal 17. When the engine speed subsequently approaches the target value, "1" signal is outputted from a ninth map M9. The "1" signal permits the throttle-opening-degree-up signal or the throttle-opening-degree-down signal to be fed to the throttle actuator 9 and feedback control is effected to control (increase) the opening degree $\theta$ of the throttle valve 8 to the target value. When the opening degree $\theta$ of the throttle valve 8 approaches the target value, "1" signal is outputted from a tenth map M10. The "1" signal resets the flip-flop 28, and accordingly generation of the air-fuel-ratio-enriching signal, the supercharging-pressure-up signal and the supercharging-pressure-down signal, which has been prevented from being outputted during deceleration, is permitted. Thus the time required to control the opening degree $\theta$ of the throttle valve 8 during return from deceleration to steady running operation can be shortened to reduce fuel consumption.

In the driving control system of this embodiment, when the accelerator pedal 17 is abruptly depressed by a large amount to abruptly accelerate the vehicle, the engine speed Ne and the engine torque Te are increased so that the maximum engine output Pmax is obtained as shown by characteristic curve B in FIG. 6a. Thus, acceleration performance in abrupt acceleration of the vehicle can be substantially improved.

Figure 5:
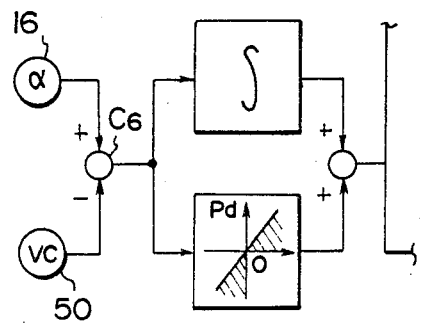
FIG. 5 is a view for illustrating the operation of the control means in accordance with another embodiment of the present invention.

Though in the above embodiment, the amount of depression of the accelerator pedal 17 is regarded as a parameter of engine output requirement, it may be regarded as a parameter of vehicle speed requirement. FIG. 5 shows another embodiment of the present invention in which the amount of depression $\alpha$ of the accelerator pedal 17 is regarded as a parameter of vehicle speed requirement. In this embodiment, the amount of depression $\alpha$ of the accelerator pedal 17 represented by the output signal of the accelerator position sensor 16 is compared, in a comparator C6, with the vehicle speed Vc represented by the output signal of a vehicle speed sensor 50 shown by dotted line in FIG. 2 which detects the vehicle speed through the rotational speed of the output shaft 26 of the stepless transmission 4. The difference between the amount of depression of the accelerator pedal 17 and the vehicle speed Vc is controlled through a proportional plus integral control action to calculate engine output requirement Pd. Subsequently, the same control as in the embodiment described in FIG. 4 is carried out using the engine output requirement thus obtained.

Though in the above embodiments, the transmission ratio Kg and the opening degree of the throttle valve are changed so that the engine output requirement represented by the amount of depression of the accelerator pedal can be obtained with a minimum fuel consumption during steady running operation, the present invention can be applied to any other automotive driving control systems in which the transmission ratio Kg and the opening degree of the throttle valve are changed so that the engine output corresponding to the amount of depression $\alpha$ of the accelerator pedal is obtained.

Further, though in the above embodiments, both the transmission ratio Kg (engine speed Ne) and the opening degree $\theta$ of the throttle valve 8 (engine torque) are controlled to maximize the engine output when the vehicle is to be abruptly accelerated, only one of them may be controlled to maximize the engine output. Though in the above embodiments, the accelerator position sensor 16 is used as both the means for detecting the amount of operation of the accelerator and the means for detecting the acceleration requirement, other acceleration-requirement detecting means, e.g., one which detects acceleration requirement through change of negative pressure in the intake passage, may be employed. Further, the control means may comprise a digital computer instead of the analogue computer employed in the above embodiments. Further, though in the above embodiment, air-fuel ratio is set at a preset value, it may be changed according to engine load.

We claim:

1. An automotive driving control system comprising a stepless transmission provided between an engine and driving wheels, a transimssion control means for controlling the transmission ratio of the stepless transmission, a throttle valve disposed in the intake passage of the engine, a throttle valve driving means for driving the throttle valve to control the opening degree thereof, first detecting means for detecting the amount of operation of the accelerator, second detecting means for detecting acceleration requirement, and a control means which receives the outputs of the first and second detecting means to control the transmission control means and the throttle valve driving means to respectively control the transmission ratio of the stepless transmission and the opening degree of the throttle vavlve so that the engine output requirement as represented by the amount of operation of the accelerator is satisfied and control at least one of the transmission control means and the throttle valve driving means so that engine output corresponding to the amount of operation of the accelerator is obtained when the acceleration requirement is smaller than a predetermined value and maximum engine output is obtained when the acceleration requirement is larger than the predetermined value wherein acceleration requirement greater than said predetermined value corresponds to an abrupt acceleration of an automobile.

2. An automotive driving control system as defined in claim 1 in which said second detecting means detects the acceleration requirement from the output of the first detecting means.

3. An automotive driving control system as defined in claim 2 in which when change in the amount of operation of the accelerator is larger than a predetermined value, said control means controls at least one of the transmission control means and the throttle valve driving means so that the maximum engine output is obtained.

4. An automotive driving control system as defined in claim 2 in which when the difference between engine output requirement as represented by the amount of operation of the accelerator and the actual engine output is larger than a predetermined value, said control means controls at least one of the transmission control means and the throttle valve driving means so that the maximum engine output is obtained.

5. An automotive driving control system as defined in claim 1 in which said control means controls the throttle valve driving means and the transmission control means to full open the throttle valve and to control the transmission ratio of the stepless transmission so that the engine speed is made maximum.

6. An automotive driving control system as defined in claim 1 in which said first detecting means outputs the maximum value irrespective of the actual amount of operation of the accelerator when said acceleration requirement as detected by the second detecting means is larger than a predetermined value.

7. An automotive driving control system as defined in claim 1 in which said control means being adapted to control, when the amount of depression of the accelerator pedal is within a predetermined range, the throttle valve driving means so that the opening degree of the throttle valve is fixed at a predetermined constant value irrespective of the amount of depression of the accelerator pedal, and the transmission control means to control the transmission ratio of the stepless transmission to change the engine speed so that the engine output requirement represented by the amount of depression of the accelerator pedal can be obtained with the predetermined constant value of the opening degree of the throttle valve.

8. An automotive driving control system as defined in claim 7 further comprising an air-fuel ratio enriching means which is adapted to enrich air-fuel ratio under the control of said control means to maximize the engine output.

9. An automotive driving control system as defined in claim 7 further comprising a supercharger which is adapted to be actuated to maximize the engine output under the control of said control means.

10. An automotive driving control system comprising a stepless transmission provided between an engine and driving wheels, a transmission control means for controlling the transmission ratio of the stepless transmission, a throttle valve disposed in the intake passage of the engine, a throttle valve control means for controlling the opening degree of the throttle valve, an engine speed detecting means, an engine torque detecting means, means for detecting the amount of operation of the accelerator, and a control means for controlling the transmission control means and the throttle valve control means, the control means controlling the transmission control means to control the transmission ratio of the stepless transmission so that engine speed corresponding to the amount of operation of the accelerator is obtained, the control means further controlling the throttle valve control means to control the opening degree of the throttle valve to a target value which is determined from the actual engine speed and engine output requirement corresponding to the amount of operation of the accelerator, and the control means controlling at least one of the transmission control means and the throttle valve control means so that maximum engine output is obtained irrespective of the amount of operation of the accelerator when the deviation of the engine output requirement from the actual engine output is larger than a predetermined value where said predetermined value corresponds to an abrupt acceleration of an automobile.

11. An autmobile driving control system as defined in claim 1 in which said engine output corresponding to the amount of operation of the accelerator is obtained by changing the engine speed with the opening degree of the throttle valve being held along a wide open throttle curve or a curve near thereto.

* * * * *